United States Patent [19]

Laughlin

[11] Patent Number: 5,221,987
[45] Date of Patent: Jun. 22, 1993

[54] FTIR MODULATOR

[76] Inventor: Richard H. Laughlin, 1906 Campbell Trail, Richardson, Tex. 75082

[21] Appl. No.: 866,836

[22] Filed: Apr. 10, 1992

[51] Int. Cl.⁵ .................. G02B 5/12; G02B 26/00; B02F 1/28
[52] U.S. Cl. .................................. 359/222; 359/529
[58] Field of Search .................... 354/154–155, 354/227; 359/199, 222, 529; 372/12, 99

[56] References Cited

U.S. PATENT DOCUMENTS

| | | | |
|---|---|---|---|
| 2,565,514 | 8/1951 | Pajes | 88/61 |
| 2,997,922 | 8/1961 | Kaprelian | 88/61 |
| 3,338,656 | 8/1967 | Astheimer | 350/320 |
| 3,376,092 | 4/1968 | Kushner et al. | 350/285 |
| 3,514,183 | 5/1970 | Rabedeau | 350/160 |
| 3,559,101 | 1/1971 | Parker et al. | 332/7.51 |
| 3,649,105 | 3/1972 | Treuthart | 350/285 |
| 4,165,155 | 8/1979 | Gordon et al. | 350/285 |
| 4,249,814 | 2/1981 | Hull et al. | 354/154 |
| 4,361,911 | 11/1982 | Buser et al. | 455/605 |
| 4,613,203 | 9/1986 | Proetel et al. | 359/529 |
| 4,714,326 | 12/1987 | Usui et al. | 359/222 |
| 4,738,500 | 4/1988 | Grupp et al. | 359/199 |
| 4,796,263 | 1/1989 | Rampolla | 372/99 |

Primary Examiner—Nelson Moskowitz
Attorney, Agent, or Firm—Ross, Howison, Clapp & Korn

[57] ABSTRACT

A modulating device based on the principal of frustrated total internal reflection that functions over a wide range of angles and wave lengths. The modulator is comprised of two refractive elements that initially are in contact. The edges of the elements are forced apart by a piezo electric transducer and the elasticity of the second refracting element lifts the center of that element away from the first refracting element. The amount of reflection at the interface of the two refractive elements is a function of their spacing. This reflection is reduced to zero by the addition of a thin plastic layer on the surface of one of the refracting elements which allows total contact across the entire surface of the two refractive elements.

24 Claims, 4 Drawing Sheets $N_1 \sin \theta_1 = N_2 \sin \theta_2$

FTIR MODULATOR

TECHNICAL FIELD OF THE INVENTION

This invention relates to optical modulators for switching and modulating the amplitude of an optical beam having a moderate cross section. More specifically, the present invention relates to a frustrated total internal reflection modulator, that is normally in the off mode, that functions over a large range of angles of incidence and has extremely low reflection in the off mode. This invention has application to covert retromodulators, for identification friend or foe and other forms of communication as well as Q-switches for lasers, and optical choppers.

BACKGROUND OF THE INVENTION

Heretofore, in the field of optical communications and in the sub field of Identification Friend or Foe various attempts have been made to develop an omnidirectional transponder that will remain covert until interrogated with the proper optical beam and only then responds with the proper message. These attempts have included modulating devices, such as polarizers and acousto-optic modulators. However, these devices are functionally dependent upon the interrogating wave length, polarization, and angle of incidence. Under some conditions these devices will return optical energy in the "off mode" thus destroying their covert characteristics.

To overcome this deficiency a mechanical shutter was placed in front of the retro modulator so that the modulator could maintain its covertness, or fail to return optical energy in the presence of a unauthorized interrogation. However these shutters were bulky and relatively slow in response. As a result, attempts have been made to use retro reflective characteristics of lenses to modulate the signal at the lens focal plane. This attempt has been accomplished by moving the reflecting surface at the focal plane or by modulating the reflectivity at the focal plane by various modulation techniques. Dr. Buser, Director of the Army's Center for Night Vision and Electro Optics notes in his U.S. Pat. No. 4,361,911 entitled "Laser Retroreflector System for Identification Friend or Foe": "At the present time there is no known wide field-of-view laser retroreflector which can be interrogated successfully and yet remain covert" (Col. 1, lines 21-23). In this patent Buser teaches a lens system with an acousto-optic modulator at the focal plane to return the signal. However, these lens systems are bulky and have a limited field of view when compared to a corner cube.

There have been several designs using Frustrated Total Internal Reflection (FTIR) to accomplish switching or modulation of a beam of light. In almost all cases these systems begin with an air gap which produces total internal reflection, and then rapidly drives the material to less than one tenth wave length spacing to produce frustrated total internal reflection. These systems are typified by U.S. Pat. Nos. 4,249,814; 3,649,105; 3,559,101; 3,376,092; 3,338,656; 2,997,922; and 2,565,514. U.S. Pat. No. 3,514,183 teaches the use of a device in which the edges of a transparent member are attached to a prism and the center of the secondary glass plate is pulled away from the prism. In all of these systems there is a problem in overcoming stiction and damage to the glass. These systems experience two specific problems. To achieve contact closure in a short time requires that the two surfaces be driven together with great force. The high rate of deceleration that the surfaces experience when they come in contact with each other causes cold welding and fracturing thus limiting the useful life of the device. In addition when the two surfaces are pulled apart with a uniform force across their interface or from the center there is a vacuum that is formed between the two surfaces, and a great deal of force is required to overcome the stiction.

Most of the systems have been designed to operate at a single wave length and a single angle of incidence, near the critical angle. Many of these designs acknowledge that the reflection does not go to zero. To overcome the problem of stiction and damage U.S. Pat. No. 4,165,155 teaches a device with zero reflectivity when operating at a spacing of 1 wave length. However, this device will work for only one wavelength and one angle of incidence, and thus would not be covert for a wide range of angles and wavelengths.

Previous systems have focused the design on angles near the critical angle and have not concerned themselves with the residual reflections for separations between 0 and $1/10\ \lambda$. As will be seen in FIG. 12 at the higher angles of incidence the residual reflection at spacings on the order of $1/10\ \lambda$ are significant.

Accordingly, a need has arisen for a Frustrated Total Internal Reflection Modulator that a) overcomes the problem of stiction; b) is in the off mode when not activated; c) will reduce the minimum reflection to zero over a wide range of incident angles and wave lengths; and d) is covert in the off mode over a wide range of angle and wave lengths.

SUMMARY OF THE INVENTION

A device for modulating the intensity of an optical beam is provided. The device includes a first transparent refracting element having first and second surfaces and having an index of refraction greater than one. The second surface thereof being substantially flat. A second transparent refracting element is provided and has first and second opposed surfaces and an index of refraction substantially equal to or greater than the index of refraction of the first transparent refracting element. The first surface thereof being substantially flat and being disposed adjacent to the second surface of the first transparent refracting element. An electrically actuated transducer is mounted adjacent said first and second transparent refracting elements for separating the first and second transparent refracting elements by a variable and controlled amount where the transducer is actuated. Structure is disposed adjacent the second surface of the second transparent refracting element for providing a force to return the first surface of the second transparent refracting element into substantial contact with the second surface of the first transparent refracting element when said transducer is deactivated.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
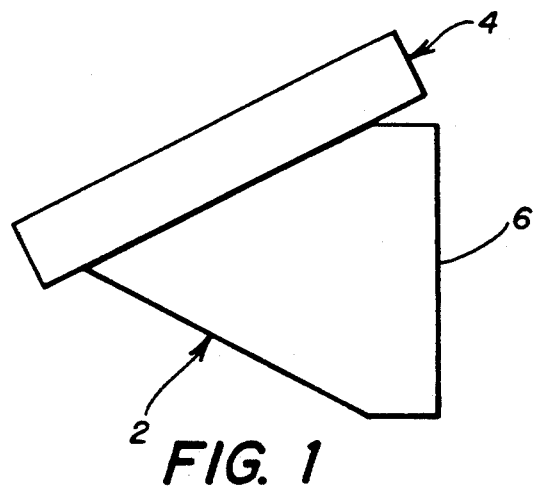
FIG. 1 illustrates the combination of the present FTIR Modulator and a prism, which is typified by a corner cube and forms a retro modulator.

A frustrated total internal reflection (FTIR) modulator varies the intensity of an optical beam from the optical device to which the modulator is attached. The modulator is attached to an optical device that changes the optical path, or is a part of the optical device that changes the optical path. Typically, the optical device is a prism. FIG. 1 illustrates a retromodulator 2 having a Frustrated Total Internal Reflection Modulator 4 attached to a corner cube 6.

Figure 2:
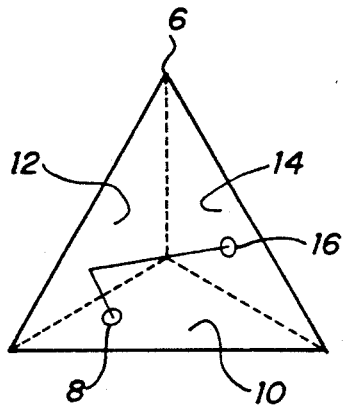
FIG. 2 is a diagram of a corner cube prism.

Corner cube 6 is an optical device with three mutually perpendicular surfaces as shown in FIG. 2. The first surface 10 is perpendicular to a second surface 12 and a third surface 14. The second surface 12 and the third surface 14 are also perpendicular to one another. The optical corner cube 6 is fabricated from a refractive material that is optically transparent to the wave lengths of interest.

Figure 3:
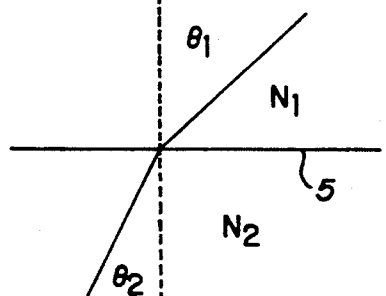
FIG. 3 is a diagram illustrating Snell's Law.

A retro reflector, corner cube, design is based on total internal reflection, which is derived from Snell's Law. Snell's Law is illustrated in FIG. 3 and is defined as:

$$N_1 \sin \theta_1 = N_2 \sin \theta_2$$

When a light ray travels from a denser medium $N_2$, such as glass, to a less dense medium $N_1$, such as air, the angle in the less dense medium is greater. The angle of $\theta_2$ that results in a value of $\theta_1$ equal to 90 degrees is designated the critical angle. For all angles of $\theta_2$ greater than the critical angle there is total internal reflection. That is, the interface 5 between $N_1$ and $N_2$, acts as a perfect mirror. For the case of $N_2 = 1.5$ and $N_1 = 1$ the critical angle is 42 degrees.

FIG. 2 shows a retro reflector with its three mutually perpendicular surfaces 10, 12, and 14. An incoming ray 8 strikes the first surface 10 and is reflected to the second surface 12 which in turn reflects it to the third surface 14. The retro reflected ray 16 then is returned parallel to the incoming ray 8. It is important to note that all rays are reflected from each of the three corner cube surfaces 10, 12, 14. Thus, if any one surface absorbs the ray and does not reflect the ray, no rays will be returned.

Figure 4:
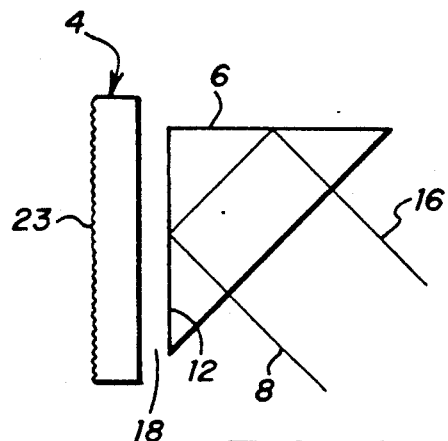
FIG. 4 is a two dimensional illustration of a corner cube prism with total internal reflection.
Figure 5:
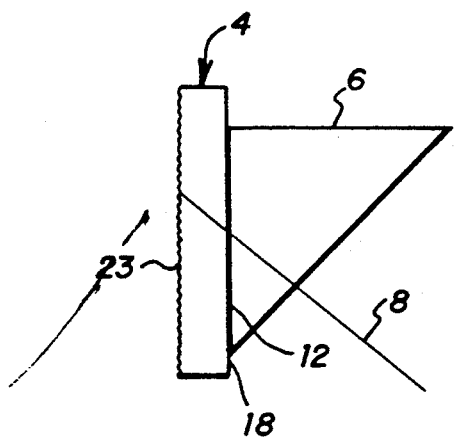
FIG. 5 is a two dimensional illustration of a corner cube prism with frustrated total internal reflection.
Figure 6:
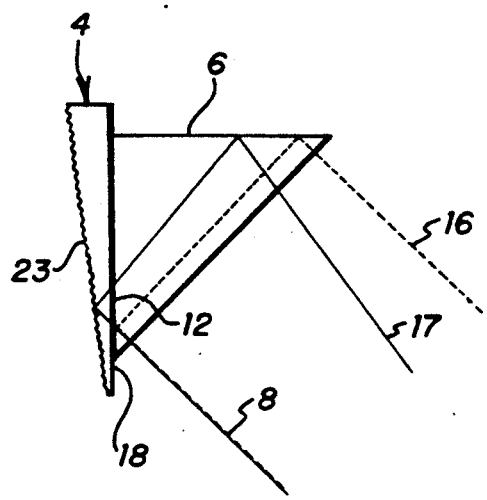
FIG. 6 is a two dimensional view of a wedged refracting element frustrating the prism total internal reflection.

FIG. 4 illustrates the concept in two dimensions, the third surface is not shown for simplicity. It can be seen that the incoming ray 8 is reflected at the second surface 12 by total internal reflection. Secondary plate 4 has substantially the same index of refractions as the corner cube 6, with a spacing 18 greater than one wave length of light. Both the contact surface of the secondary plate 4 and the surface of the corner cube 6 are optically flat. However the opposing surface 23 of the secondary plate 4 is treated, typically by etching and blackening so that surface 23 absorbs and scatters the light and does not reflect light. When secondary plate 4 is brought into contact with the corner cube surface 12, the total internal reflection is frustrated, as shown in FIG. 5. $N_1$ is now substantially equal to $N_2$ and the conditions for total internal reflection no longer exist. The incoming ray 8 now travels into the secondary plate 4 and is scattered and absorbed at the opposing surface 23 but is not reflected. The result is that the corner cube 6 no longer retro reflects the optical energy impinging on cube 6. An alternative to absorbing the beam is to form a second beam. By introducing a wedge to the opposing surface 23 the energy is transferred from the retro reflected ray 16 into the deviated ray 17 as shown in FIG. 6.

Figure 7A:
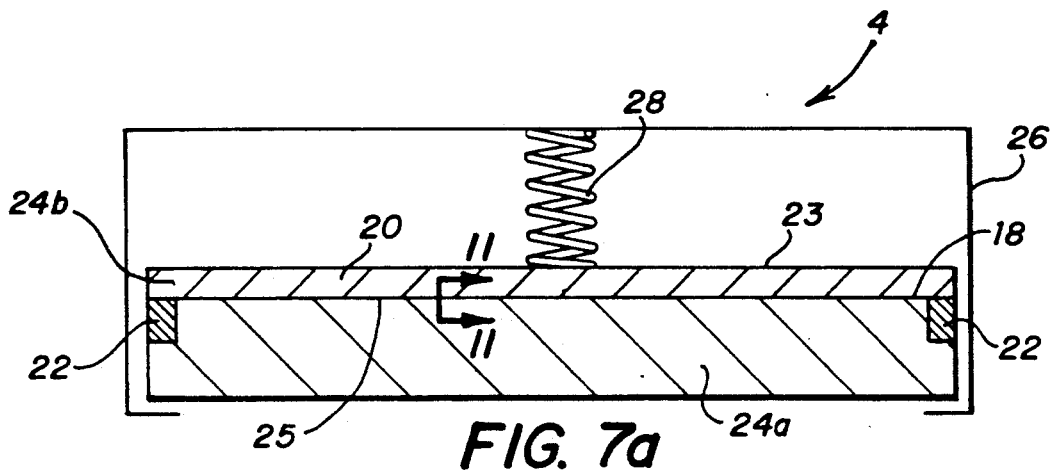
FIGS. 7a-7c illustrates the FTIR Modulator of the present invention and its operation.
Figure 7B:
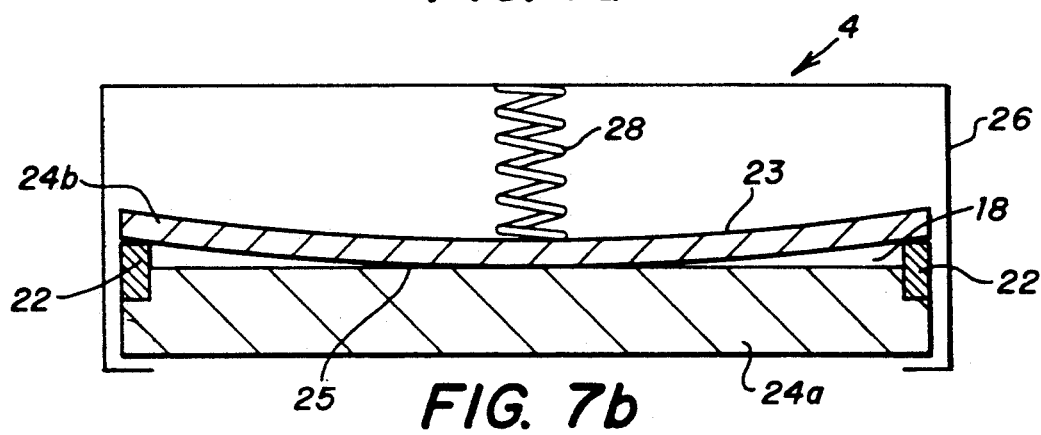
Figure 7C:
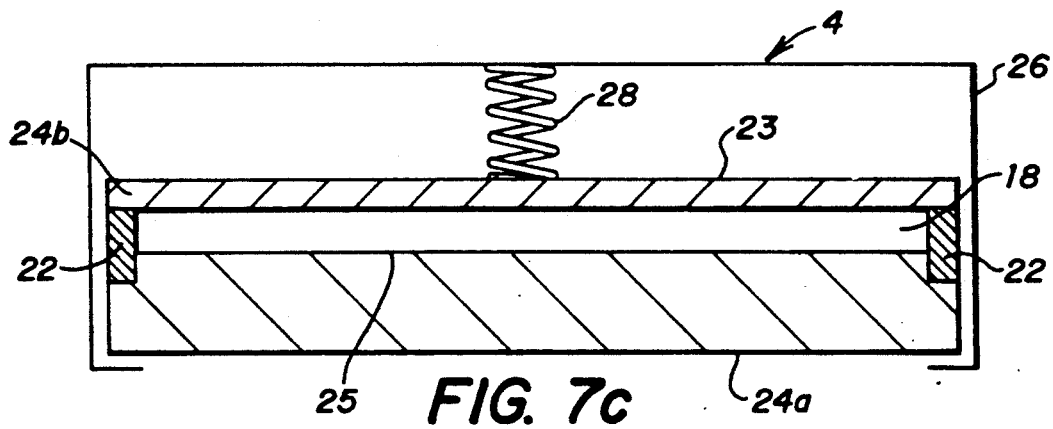

The Frustrated Total Internal Reflection Modulator 4 of the present invention is shown in FIGS. 7a-7c and includes a primary plate 24a, and a secondary plate 24b. The index of refraction of the primary plate 24a and secondary plate 24b is substantially equal to or greater than the index of refraction of the corner cube 6. A piezo-electric transducer ring 22 inset in plate 24a controls the separation 18 between the primary plate 24a and the secondary plate 24b. A plastic, low elasticity, coating 25 is applied to the primary plate 24a. These elements are contained in a frame 26 which contains a spring 28. Spring 28 generates a force on plate 24b in order to maintain plate 24b in contact with plate 24a when transducer 22 is not actuated.

Figure 8:
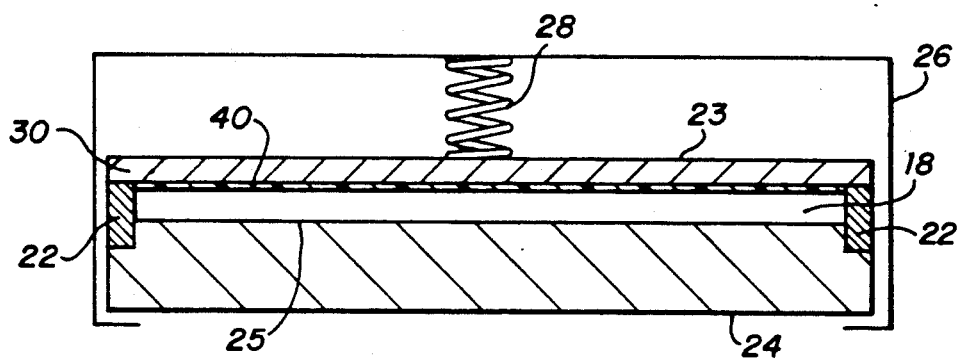
FIG. 8 illustrates an alternate configuration of the present invention for a low elasticity coating.

In the preferred embodiment the secondary plate 24b is a highly elastic material such as glass. However, in the event that the desired material for secondary plate 24b is not highly elastic, a layer 40 of non highly elastic material may be attached to a highly elastic ternary plate 30 as shown in FIG. 8.

The opposing surface 23 of the secondary plate 24b is treated so as to minimize reflections. In the preferred embodiment surface 23 is etched and blackened as shown in FIG. 4. FIG. 6 shows a wedged surface 23 as an alternative to minimizing the reflections from the secondary plate 24b.

In the preferred embodiment the Frustrated Total Internal Reflection Modulator 4 is cemented to the optical device 6. However, it should be recognized that one surface of the optical device 6 could form the primary surface 24a of the Frustrated Total Internal Reflection Modulator 4.

FIG. 7a illustrates the normal off mode, with the transducer 22 deactivated. In this mode, the air gap 18 is substantially zero and the primary plate 24a is in contact with the secondary plate 24b. In this mode, the total internal reflection is frustrated and the incoming ray 8 (FIG. 5) is transmitted into the secondary plate 24b where it can be absorbed, scattered, or reflected.

FIG. 7b illustrates modulator 4 when activated. A voltage is applied to the piezo-electric transducer 22 to cause transducer 22 to elongate. Transducer 22 then lifts the outer edges of the secondary plate 24b causing plate 24b to flex, letting air into the space 18 such that the vacuum is broken, overcoming the stiction between plates 24a and 24b.

FIG. 7c illustrates the fully on mode of the FTIR modulator 4. In this mode, the piezo-electric transducer 22 is fully extended and the elasticity of the secondary plate 24b has brought plate 24b to a near parallel condition with the primary plate 24a. In this mode it is desirable, although not necessary, to have the air gap 18 greater than one wave length over the entire length of plates 24a and 24b. With the air gap of nominally one wave length the primary plate 24a experiences total internal reflection for all angles greater than the critical angle. When properly matched to the corner cube 6, the prism also experiences total internal reflection.

When the transducer 22 is deactivated the force of the spring 28 drives the secondary plate 24b back into substantial contact with the primary plate 24a. Allowing the spring 28 to drive from the center of plate 24b will cause the secondary plate 24b to be slightly bowed in a convex shape allowing the air to escape around the edges of plates 24a and 24b and not be trapped between the plates 24b and 24a as plate 24b moves toward plate 24a to the off mode. Allowing air to escape reduces the force required to close the space 18 substantially eliminating the cold welding and fracturing that has been previously encountered.

Figure 9A:
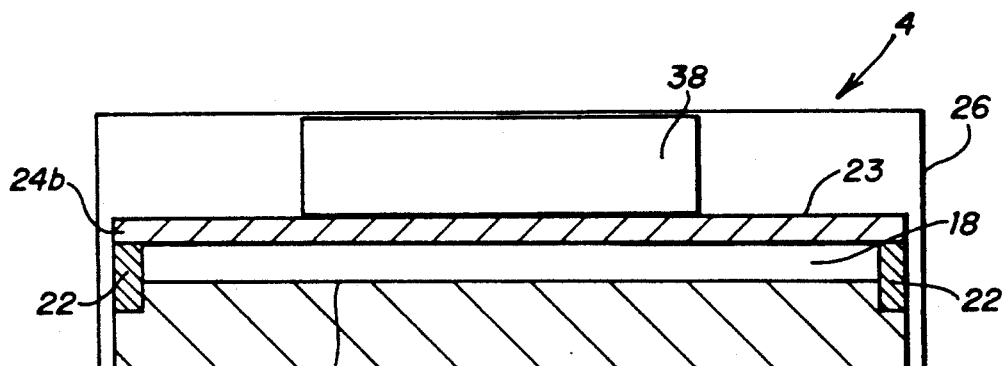
FIGS. 9a-9c illustrates a normally open configuration of the present FTIR Modulator utilizing opposing transducers.
Figure 9B:
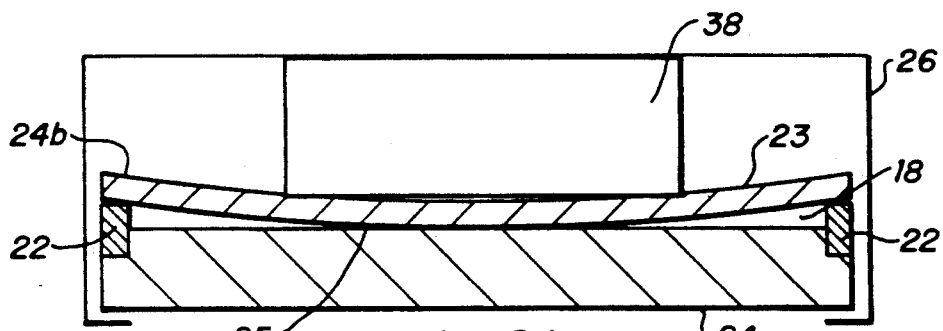
Figure 9C:
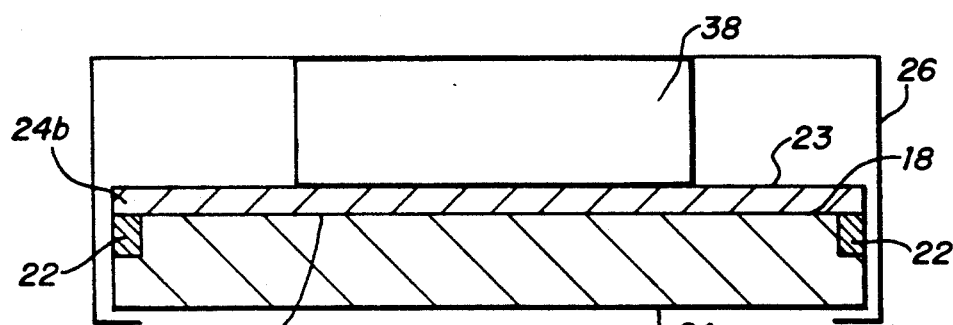
Figure 10:
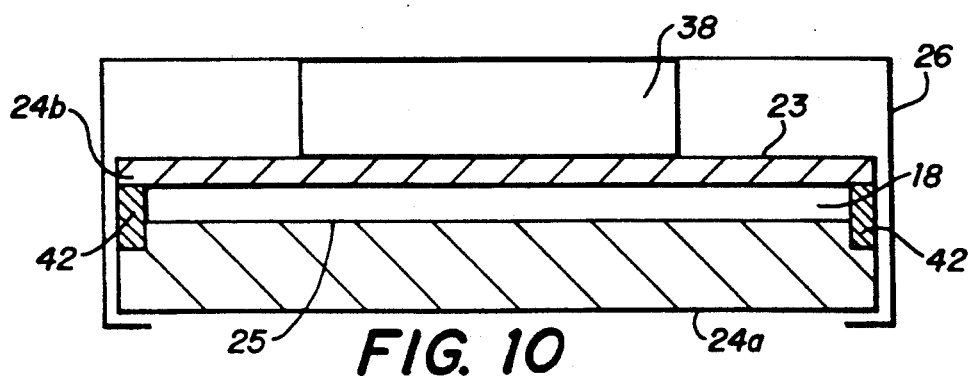
FIG. 10 illustrates a normally open configuration of the present FTIR Modulator using a driving transducer with a spring return.

FIGS. 9a-9c illustrate an additional embodiment of the present invention in which modulator 4 is normally open and total internal reflection in the corner cube 6 is present. A piezo-electric transducer 38 drives the center of the secondary plate 24b into substantial contact with the primary plate 24a. As the voltage is decreased from the transducer 22, transducer 38 allows the two plates 24 to come into contact across the entire plates 24 due to the elasticity of the secondary plate 24b. FIG. 10 shows a normally open modulator (4) where the transducer 22 is replaced by a spring 42.

Figure 11:
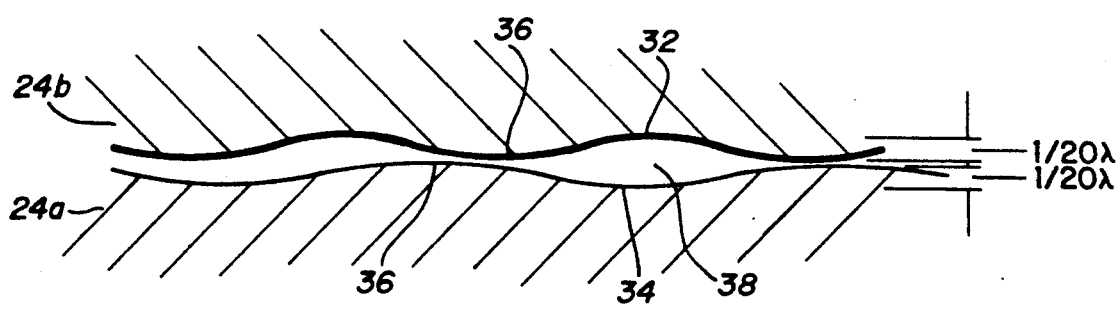
FIG. 11 is an enlarged cross-sectional view taken generally along sectional lines 11—11 of FIG. 7a illustrating the interface between the primary plate 24a and the secondary plate 24b in a closed condition.

When one describes flat and polished optical elements they are usually polished to 1/10 λ to 1/20 λ. As shown in FIG. 11, such polishing leaves a series of waves 32 and 34 across the surface. The amplitude of these waves describes the flatness of plates 24a and 24b. When one attempts to place the two surfaces 24a and 24b in contact the peaks 36 of the waves interfere leaving gaps 38 that can be twice the amplitude of the surface flatness. These gaps 38 result in the residual reflections of previous designs. By placing a thin plastic layer 40 (FIG. 8) on the primary plate 24a, layer 40 will easily deform under pressure and conform to and match the shape of the secondary plate 24b. This configuration will reduce the space 18 substantially to 0.

The reflections at a three surface 10, 12, and 14 interface (FIG. 2), as are encountered in this design, are developed from field theory and have been well defined, The reflection at surface 12, or at the interface 5 (FIG. 3) of the primary plate 24a and secondary plate 24b is defined as:

$$R = 1 - 1/[\alpha \cdot \text{Sinh}(y)^2 + \beta] \quad [1]$$

$$y = 2 \cdot \pi \cdot n_1 \cdot (d/\lambda) \cdot [(n_0/n_1)^2 \cdot \sin(\phi)^2 - 1]^{-\frac{1}{2}} \quad [2]$$

$$\alpha_s = \frac{[(n_0/n_1)^2 - 1] \cdot [(n_2/n_0)^2 \cdot (n_0/n_1)^2 - 1]}{4(n_0/n_1)^2 \cos(\phi)[(n_0/n_1)^2 \sin(\phi)^2 - 1] \cdot [(n_2/n_0)^2 - \sin(\phi)^2]^{-\frac{1}{2}}} \quad [3]$$

-continued $$\alpha_p = \alpha_s \{[(n_0/n_1)^2 + 1] \cdot \sin(\phi)^2 - 1\}^2 \quad [4]$$

$$\beta_s = \frac{\{[(n_2/n_0)^2 - \sin(\phi)^2]^{-\frac{1}{2}} + \cos(\phi)\}^2}{4\cos(\phi)[(n_2/n_0)^2 - \sin(\phi)^2]^{-\frac{1}{2}}} \quad [5]$$

$$\beta_p = \frac{\{[(n_2/n_0)^2 - \sin(\phi)^2]^{-\frac{1}{2}} + (n_2/n_0)^2\cos(\phi)\}^2}{4(n_2/n_0)^2\cos(\phi)[(n_2/n_0)^2 - \sin(\phi)^2]^{-\frac{1}{2}}} \quad [6]$$

where: The subscripts, s and p, refer to waves polarized perpendicular to and parallel to the plane of incidence, respectively.

$\phi$ = the angle from the normal in the corner cube 6, at surface 12, or in the primary plate 24a at the secondary plate 24b interface.

$n_0$ = the index of refraction of the retroreflector or the primary plate 24a. Typically 1.5

$n_1$ = the index of refraction of the gap 18, Typically 1.0

$n_2$ = the index of refraction of the secondary plate 24b. Typically 1.5

Figure 12:
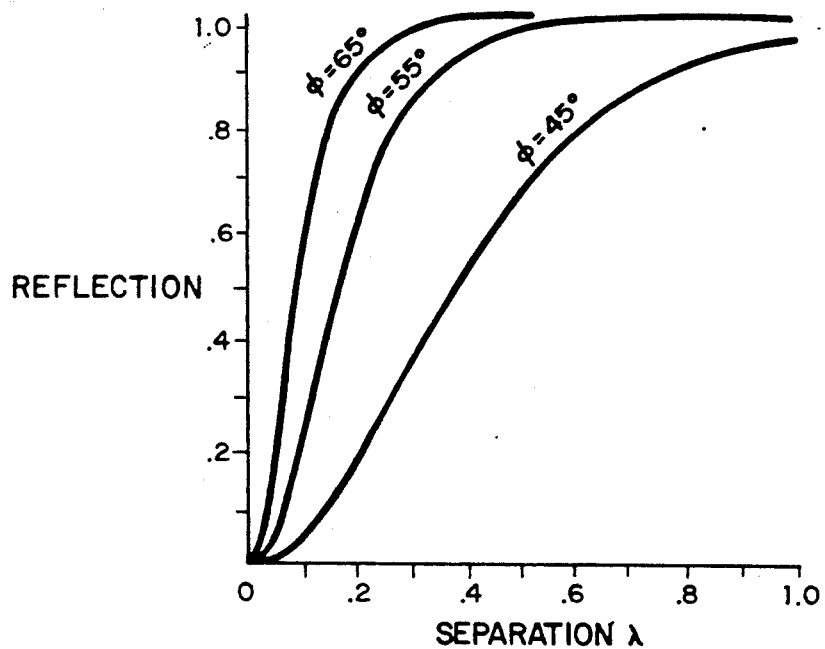
FIG. 12 presents a graph of frustrated total internal reflections as a function of spacing and angle of incidence.

FIG. 12 illustrates the FTIR modulators 4 reflection as a function of angle for several typical angles to be encountered.

Accordingly, the it can be seen that the Frustrated Total Internal Reflection Modulator of the present invention offers a covert retroreflector with substantially 0 reflection in the off condition, that operates over a wide range of incident angles and wave lengths, while overcoming the problems of stiction and fracturing of the primary and secondary plates.

Although the description above contains many specificities, these should not be construed as limiting the scope of the invention but as merely providing illustrations of some of the presently preferred embodiments of this invention. For example, the plastic layer can be attached to or be a part of either or both of the secondary and primary plates; The Frustrated Total Internal Reflection Modulator can be attached to or be a part of various prisms including a corner cube; the transducer 22 can be any device which increases its length in response to a stimulus.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A device for modulating the intensity of an optical beam comprising:

a first transparent refracting element having first and second surfaces and having an index of refraction greater than one, said second surface thereof being substantially flat;

a second transparent refracting element having first and second opposed surfaces and having an index of refraction substantially equal to or greater than the index of refraction of said first transparent refracting element, said first surface thereof being substantially flat and being disposed adjacent said second surface of said first transparent refracting element;

an electrically actuated transducer means mounted adjacent said first and second transparent refracting elements, for separating said first and second transparent refracting elements by a variable and controlled amount when said transducer means is actuated; and return means disposed adjacent said second surface of said second transparent refracting element for providing a force to return said first surface of said second transparent refracting element into substantial contact with said second surface of said first transparent refracting element when said transducer is deactivated by causing said second transparent refracting element to move toward said first transparent reinforcing element.

2. The device of claim 1 wherein said return means includes a spring.

3. The device of claim 1 wherein said return means includes a transducer.

4. The device of claim 1 wherein the second surface of said second transparent refracting element includes means for absorbing optical energy.

5. The device of claim 1 wherein said second surface of said second transparent refracting element is not parallel to said first surface of said second transparent refracting element.

6. The device of claim 1 wherein said transducer means includes a piezo-electric material.

7. The device of claim 1 and further including a prism and said first surface of said first transparent refracting element being attached to said prism.

8. The device of claim 7 wherein said prism is a corner cube.

9. The device of claim 7 wherein said prism is a right angle prism.

10. The device of claim 1 wherein said first transparent refracting element includes a prism.

11. The device of claim 10 wherein said prism is a corner cube.

12. The device of claim 10 wherein said prism is a right angle prism.

13. The device of claim 1 and further including a layer of plastic material disposed on said second surface of said first transparent refracting surface.

14. The device of claim 1 and further including a layer of plastic material disposed on said first surface of said second transparent refracting surface.

15. The device of claim 1 and further including an elastic plate, and said second transparent refracting element being attached to said elastic plate.

16. The device of claim 1 wherein said second transparent refracting element comprises an elastic material.

17. A device for modulating the intensity of an optical beam comprising:
a first transparent refracting element having first and second surfaces, opposed edges, and having an index of refraction greater than one, said second surface thereof being substantially flat;
a second transparent refracting element having first and second opposed surfaces, opposed edges, and having an index of refraction substantially equal to or greater than the index of refraction of said first transparent refracting element, said first surface thereof being substantially flat and being disposed adjacent said second surface of said first transparent refracting element;
an electrically actuated transducer means mounted adjacent said opposed edges of said first and second transparent refracting elements, for separating said opposed edges of said first and second transparent refracting elements by a variable and controlled amount when said transducer means is actuated; and return means disposed adjacent said second surface of said second transparent refracting element and disposed between said opposed edges of said second transparent refracting element for providing a force to return said first surface of said second transparent refracting element into substantial contact with said second surface of said first transparent refracting element when said transducer is deactivated, said return means causing deflection of said first surface of said second transparent refracting element centrally between said opposed edges thereof, such that said first surface of said second transparent refracting element initially contacts said second surface of said first transparent refracting element between said opposed edges thereof prior to said opposed edges of said first and second transparent refracting elements contacting each other.

18. The device of claim 17 wherein said return means includes a spring.

19. The device of claim 17 wherein said return means includes a transducer.

20. The device of claim 17 and further including a layer of plastic material disposed on said second surface of said first transparent refracting surface.

21. The device of claim 17 and further including a layer of plastic material disposed on said first surface of said second transparent refracting surface.

22. The device of claim 17 and further including an elastic plate, and said second transparent refracting element being attached to said elastic plate.

23. The device of claim 17 wherein said second transparent refracting element comprises an elastic material.

24. A device for modulating the intensity of an optical beam comprising:
a first transparent refracting element having first and second surfaces, opposed edges, and having an index of refraction greater than one, said second surface thereof being substantially flat;
a second transparent refracting element having first and second opposed surfaces, opposed edges, and having an index of refraction substantially equal to or greater than the index of refraction of said first transparent refracting element, said first surface thereof being substantially flat and being disposed adjacent said second surface of said first transparent refracting element;
means mounted adjacent said first and second transparent refracting elements, for separating said first and second transparent refracting elements; and
return means disposed adjacent said second surface of said second transparent refracting element and disposed between said opposed edges of said second transparent refracting element for providing a force to return said first surface of said second transparent refracting element into substantial contact with said second surface of said first transparent refracting element, said return means causing deflection of said first surface of said second transparent refracting element centrally between said opposed edges thereof, such that said first surface of said second transparent refracting element initially contacts said second surface of said first transparent refracting element between said opposed edges thereof prior to said opposed edges of said first and second transparent refracting elements contacting each other.

* * * * *